April 26, 1938.  C. W. ABBOTT  2,115,000
WIRING SYSTEM
Filed June 10, 1935  3 Sheets-Sheet 1
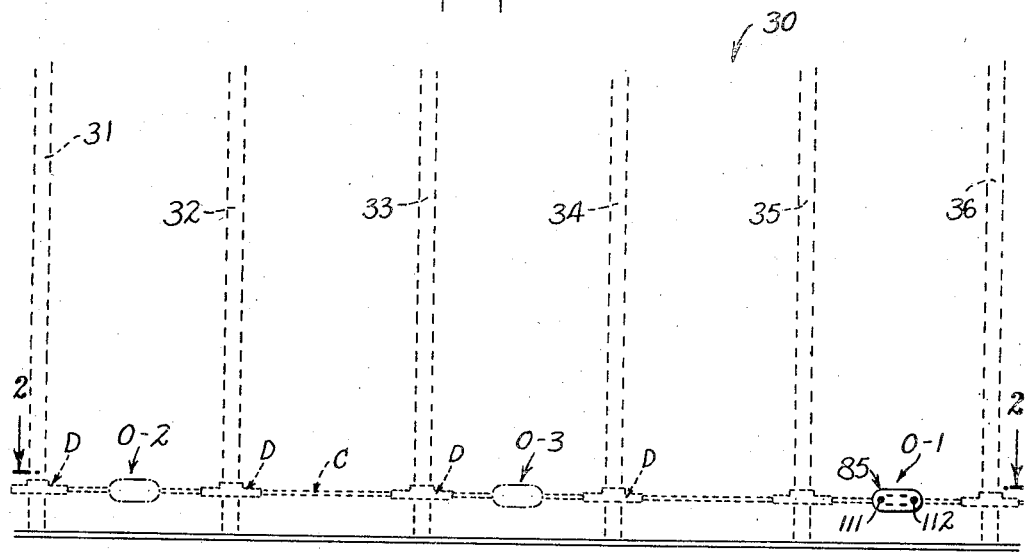
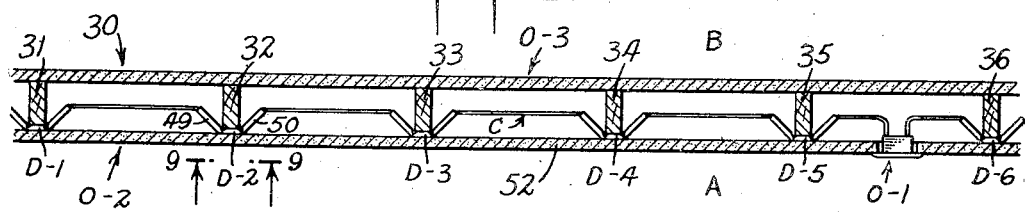
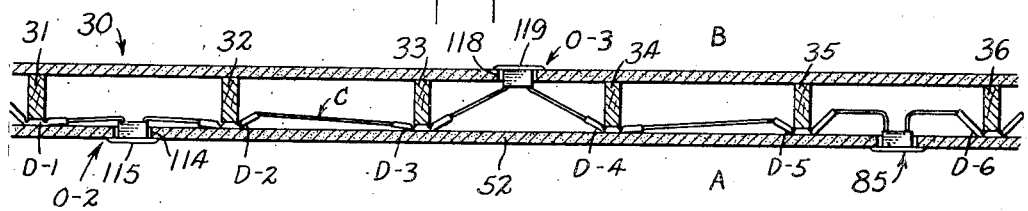
INVENTOR
Charles W. Abbott
BY
Blair, Curtis & Dunne
ATTORNEYS April 26, 1938.　　　　C. W. ABBOTT　　　　2,115,000
WIRING SYSTEM
Filed June 10, 1935　　　　3 Sheets-Sheet 2
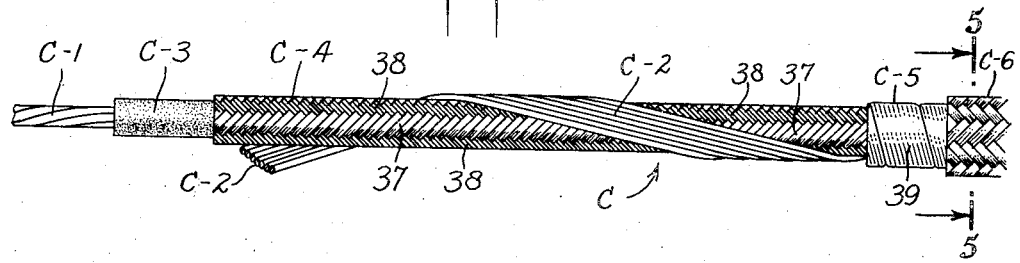
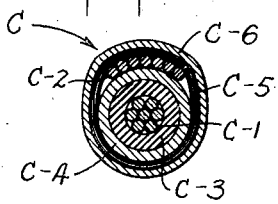
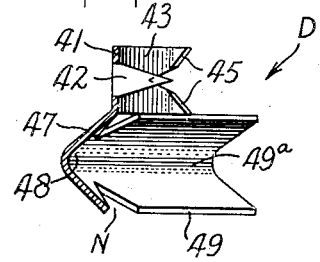
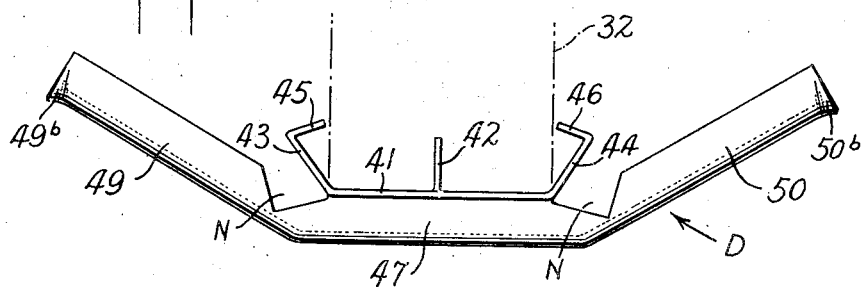
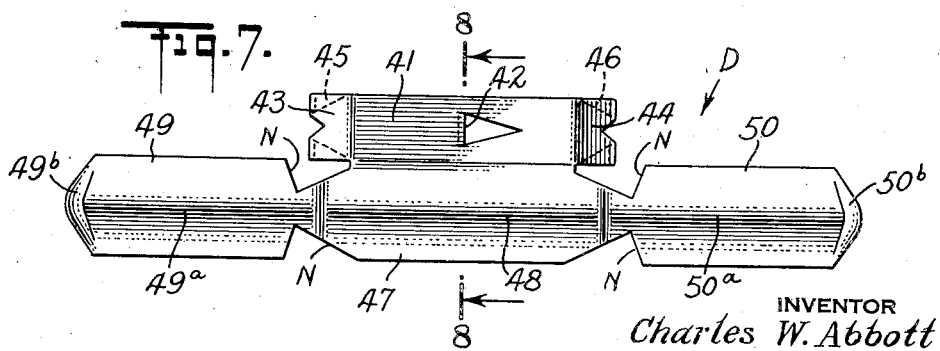
INVENTOR
Charles W. Abbott
BY
Blair, Curtis & Dunne
ATTORNEYS April 26, 1938.  C. W. ABBOTT  2,115,000
WIRING SYSTEM
Filed June 10, 1935  3 Sheets-Sheet 3
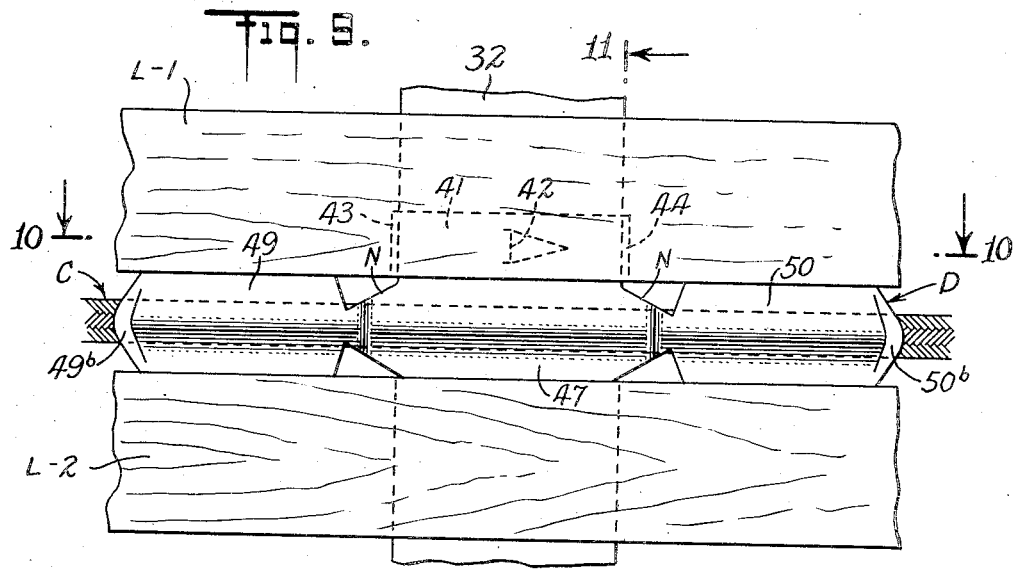
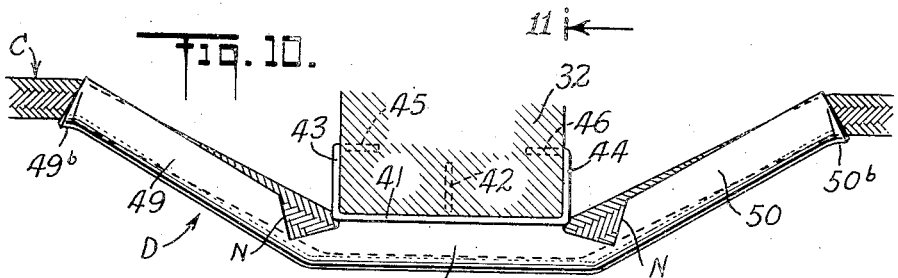
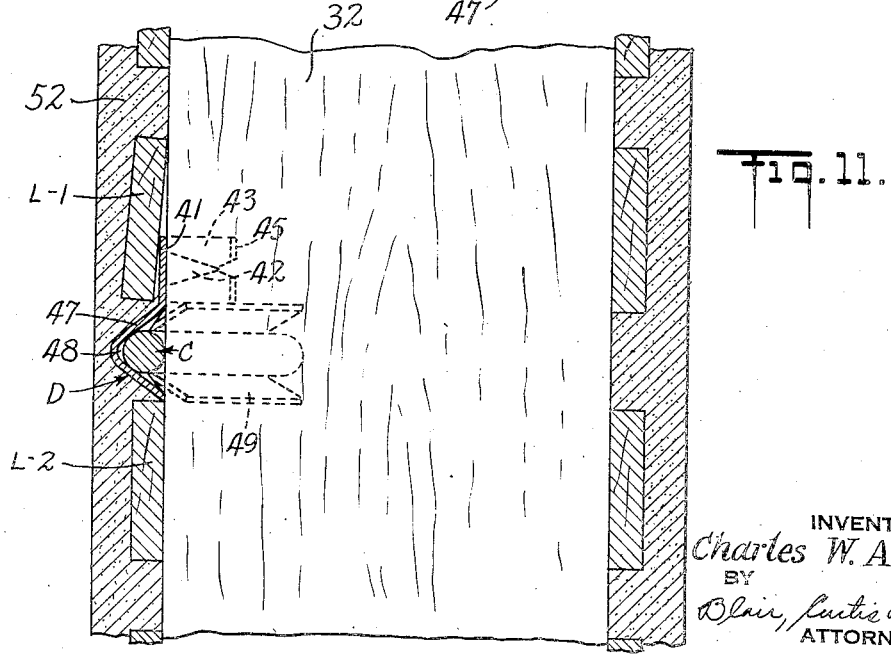
INVENTOR
Charles W. Abbott
BY
Blair, Curtis & Dunne
ATTORNEYS Patented Apr. 26, 1938

2,115,000

UNITED STATES PATENT OFFICE 2,115,000

WIRING SYSTEM

Charles W. Abbott, Larchmont, N. Y.

Application June 10, 1935, Serial No. 25,830

10 Claims. (Cl. 247—3)

This invention relates to wiring systems, particularly to wiring systems of relatively low voltage, such as 110 volts, and a typical illustration of which is a household wiring system for illumination and for the operation of usual electrical accessories which may include also devices or apparatus employing motors of relatively small power outputs.

One of the objects of this invention is to provide a practical and durable wiring system that may be easily and inexpensively installed, particularly during the construction of the building, and which, even after installation, may be inexpensively and readily expanded or elaborated, particularly by increasing the number of taps or outlets as may be dictated by practical needs. Another object is to provide a wiring system of the above-mentioned character which in its component parts will be of relatively low first cost and which is capable of dependable and reliable installation at relatively low cost. Another object is to provide a simple, inexpensive and durable means for incorporating in a building construction insulated conductors.

Another object is to provide a mounting for insulated or multiple conductor construction with respect to the building construction to achieve such mechanical and electrical flexibility that expansion of the wiring system, as by adding thereto additional electrical fixtures, can be achieved with great facility, a minimum of labor, avoidance of damage and repair to the building construction, and hence a minimum of cost.

Another object is to provide a wiring system of the above-mentioned nature which will materially reduce first cost of installation, bring about lower cost of subsequent expansion or elaboration thereof, and which in general will be electrically and mechanically efficient and well adapted to meet the widely varying conditions met with in practice. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which is shown a preferred embodiment of the mechanical and electrical features of my invention, Figure 1 is a perspective view of a portion of a wall of a building, the wall being shown as it seen from the inside of the building or a room thereof; the wall is assumed to be an inside wall though, as will later be made clearer, it may also be an outside wall;

Figure 2 is a horizontal sectional view, as seen along the line 2—2 of Figure 1, showing a portion of a typical installation of my wiring system with respect to the building construction itself, the various parts being shown substantially as they appear when the building construction, with the wiring system incorporated therein, is completed;

Figure 3 is a view similar to that of Figure 2 but showing the wiring system as it has been expanded by the subsequent addition thereto or incorporation therein of two additional fixtures, illustratively outlet receptacles, one on each side of the wall;

Figure 4 is a view on an enlarged scale of a preferred form of multiple insulated conductor construction forming part of the wiring system, the construction being shown with successive portions thereof broken away or removed in order more clearly to show the component parts thereof;

Figure 5 is a sectional view, on an enlarged scale and seen along the line 5—5 of Figure 4;

Figure 6 is a top or plan view of a conductor clamp or support, on a greatly enlarged scale as compared to the scale of Figures 1, 2 and 3;

Figure 7 is a front view thereof, as seen from the bottom of Figure 6;

Figure 8 is a vertical sectional view, as seen along the line 8—8 of Figure 6;

Figure 9 is a front elevation, on a greatly enlarged scale as compared with Figures 1, 2 and 3, showing the interrelation of the conductors and clamp of my wiring system with the building construction itself, certain parts being indicated in broken lines, this view being substantially a view as seen, for example, along the line 9—9 of Figure 2;

Figure 10 is a plan view of the parts shown in Figure 9, certain of the parts, however, being omitted to show certain features of the construction more clearly; and Figure 11 is a vertical central sectional view, as seen along the line 11—11 of Figure 9.

Similar reference characters refer to similar parts throughout the several views of the drawings.

As conducive to a readier understanding of the various features of my invention, reference might first be made to Figure 1 of the drawings in which, at 30, I have shown a portion of a wall of a building as that wall is seen from the inside. The wall may be an outside wall or an inside wall such as a partition wall, and to better illustrate my invention let it be assumed that wall 30 is such an inside or partition wall between two rooms or spaces which in Figure 2 are indicated generally at A and B. Though I term the member 30 a wall, it is to be understood that the member 30 may just as well be treated as a ceiling or floor of a room since, as will later more readily appear, the structural features of my wiring system coact just as well and in substantially the same way with the component parts of a floor or ceiling as they do with the component parts of a side wall; in usual types of frame construction, the side walls are built up out of vertically extending columns called "joists" and in ceiling and floor construction, the latter are built up out of horizontally extending members called "beams". Though, therefore, in the ensuing description or claims reference is made to "joists" and to a wall or walls, it is to be understood that these terms are to be broadly interpreted to include therein also so-called "beams" and flooring or ceilings, respectively.

The wall 30 comprises a suitable number of joists usually of wood and suitably spaced, generally by a spacing on the order of two feet, and carry on the two wall faces thereof lathing, either of wood or metal, and the usual form of plaster or like wall surfacing. Of course, where the wall is an outside wall, the surfacing on the outside face thereof is of any suitable character appropriate to its purpose.

In Figure 2 is shown a portion of wall 30 in horizontal section and the joists 31, 32, 33, 34, 35 and 36, of that portion of the wall. Since, to better illustrate my invention, wall 30 is assumed to be an inside wall, both faces thereof are to have a lath and plaster surfacing carried by the joists 31, 32, etc.

Let it be assumed that, in the planning of the building, it is planned to have an outlet receptacle exposed to room A (Figure 2) at a location O—1, but that no fixture or outlet or the like is planned for or foreseen for room B in so far as the particular section or wall 30 is concerned. And with these assumptions, the construction and installation of the wiring system of my invention may now be proceeded with.

The conductors of the system are installed as soon as the frame, illustratively the joists 31, 32, etc. of Figures 1 and 2, are in place and prior to wall surfacing, as by lathing and plastering, and accordingly, I provide a "run" of conductor along the joists 31, 32, etc. in a horizontal line at the same height above the flooring as is the location O—1 (Figure 1) for the outlet or fixture and this run is made preferably with a multiple insulated conductor construction, hereinafter called simply "conductor construction" and designated generally by the reference character C (Figures 1 and 2) and supports or mountings therefor, whereby it is secured to or held in place with respect to the joists 31, 32, 33, etc. In Figure 2 these supports, one for each joist, are indicated generally by the reference character D.

A preferred form of conductor construction C is shown in Figures 4 and 5 but it is to be understood that my invention is not to be limited or restricted thereto unless otherwise set forth in the claims. The conductor construction C, where it is to be employed in a two-wire circuit or system, embodies two conductors, C—1 and C—2, the former of which is at the core or forms the core and the latter of which is preferably arranged in a helix and preferably forms the grounded side of the circuit. Preferably both conductors are stranded and each may be made up of, for example, seven individual wires; where conductor C—2, however, is to be in the form of a helix, its wires are preferably arranged side by side in the form substantially of a band, as shown.

Core conductor C—1 has about it an insulating compound C—3 composed preferably of any suitable rubber compound and appropriately cured; preferably this compound is latex whose insulating characteristics are such that I may use a very small wall thickness therefor, on the order of 0.025 inch.

About the rubber covering C—3 is a covering C—4 preferably made of strands, generally circular in cross-section, of insulating fibrous material, such as paper 37, that extends helically about the covering C—3 and have interwoven therewith strands 38 of suitable material, such as cotton, the two being closely braided or interwoven about the covering C—3. The helixes of the paper strands 37 preferably extend about the axis of the construction in the same direction as those of the outer strands or wires of the core conductor C—2. Thus, a mechanically strong and tough protective covering is provided and yet appropriate flexibility achieved. Covering C—4 may be treated with any suitable material to make it moisture proof and fire resisting.

The mechanical strength, toughness and hardness of the covering C—4 form a good foundation for the reception of the helical band conductor C—2 which is tightly wrapped thereabout but of a pitch relatively great, on the order of one turn for every two inches or so.

Next I apply a covering C—5 made up of a band or tape-like insulating material preferably in the form of laminated paper band 39 of substantial thickness and of appropriate width, illustratively on the order of three-sixteenths of an inch and of corresponding pitch, forming a mechanically strong encasing of the otherwise bare conductor C—2. Preferably, it is also made moisture proof and fire resisting.

Then the casing-like covering C—6, preferably braided of thread or cord, such as cotton thread, is applied and snugly encases and anchors the helical paper band 39, being also preferably treated or impregnated to water- and fire-proof it and to toughen it to better resist abrasion, breaking, tearing, or the like.

Thus, both sides of the circuit may be embodied in a single conductor construction and where the latter takes the form above described desirable flexibility is also achieved. The conductor C is strung along the joists 31, 32, 33, etc., horizontally and at the desired height above the floor, prior to the application to the joists themselves of the lathing, plaster, or like wall surfacing, and it is supported by or attached to the joists by means of clamp-like supports or devices D, one for each joist. The devices D are of a construction that is better shown in Figures 6, 7 and 8 and they are made preferably of a suitable sheet metal and, moreover, constructed so that they may be readily and inexpensively stamped.

The device D (Figures 6, 7 and 8) comprises a base portion 41 that is substantially flat and of a length substantially equal to the width of the front edge of the joists to which the devices D are to be secured, and in Figure 6 this relation of the parts appears clearly with respect to joist 32 which is indicated in broken lines in that figure.

Centrally of the base portion 41 (Figures 6, 7 and 8), there is stamped and bent inwardly and out of the plane thereof a prong 42 while the two ends of the base portion 41 are extended to provide arms 43 and 44 which are normally at an obtuse angle to the base portion 41; the ends of the arms 43 and 44 are stamped or cut to provide double prongs 45 and 46, respectively, that extend at substantially right angles to their respective arm-like portions 43—44.

Extending along the lower edge of the base portion 41 and integrally formed therewith is the conductor-receiving and -encasing part 47 which is of a length greater than the length of the base portion 41 and which in cross-section (see now Figure 3) is pressed or bent to form an open-sided triangle, the open side of which faces in the same direction as does the prong 42 in the base portion 41, and hence toward the face of the joist 32 to which the device D is to be secured. The portion 47 may be and preferably is slightly rounded or curved in cross-section in order to form a more snug and more appropriate conductor-receiving channel 48 on the concave side thereof, the part 47 being thereby shaped or dimensioned to receive within the channel 48 the conductor construction C above described.

As is better shown in Figures 6 and 7, the part 47 of the device D has extensions 49 and 50, preferably formed integrally therewith, one at each end of the part 47 and in cross-section substantially the same as part 47 itself. However, these wings or extensions 49, 50 are bent or otherwise formed or shaped to extend at an obtuse angle to the line or axis of the conductor-receiving part 47, and this angle, as is better seen from Figure 6, is on the order of 135°.

The conductor-receiving channel 48 of the central part 47 (Figures 6 and 7) is thus extended at each end thereof, at the left-hand end by the channel 49ª in the wing or extension 49 and at the right-hand end thereof by the channel 50ª of the wing or extension 50. Furthermore, the extensions 49 and 50 are bell-mouthed as at 49ᵇ and 50ᵇ, respectively, in line with the bases of the conductor-receiving channels 49ª and 50ª, respectively, all for a purpose later described.

As will also be made clearer later, I provide for a change, under certain circumstances, in the angular relation between the extension 49 and the part 47 and between the extension 50 and the part 47, and accordingly, I prefer to make the junctions between the extensions and the part 47 capable of relative ease of flexing. Accordingly, and principally because the cross-sectional shape of the parts 49—47—50 is one which resists bending, I prefer to notch or cut away some of the sheet metal of the side walls of these parts, as by cutting or stamping notches N (Figures 6 and 7) adjacent the junctions of the wings or extensions 49 and 50 with the part 47.

This notched construction not only facilitates the initial shaping of the parts or rather the establishment of the above-mentioned obtuse angles, as is better shown in Figure 6, but also makes for a flexing or yieldability of either or both of the channel extension members 49 and 50 under conditions of actual installation or use, as will later be pointed out.

Accordingly, the conductor construction C is secured to each joist (Figure 2) by a device D like that just described and in actual practice, the conductor construction C is laid into the channel 48 of part 47 (Figures 6, 7 and 3), resting, of course, also in the channels 49ª and 50ª of the extensions 49 and 50, respectively, and then, with the device D positioned against the front vertical face of a joist so that its base portion 41 extends parallel to the face of the joist and is supported with respect to it, base portion 41, and hence the device D in its entirety, is forced, as by hammering, snugly against the face of the joist, prong 42 (Figure 6) being thus driven into the joist 32. Thereupon the end extensions 43 and 44 (Figure 6) with their respective prongs 45 and 46 are hammered to drive the prongs into the respective side faces of the joist and to bring the arms 43 and 44 snugly into engagement with the respective side faces of the joist, the parts thereby assuming a relation better shown in Figures 9 and 10.

In this connection, it is to be noted that the device D becomes securely fastened to the joist, portions of the latter being in effect snugly clamped as, for example, between the end extensions 43 and 44 of the base portion 41. Moreover, the side prongs 45 and 46 dependably resist any action tending to pull or force the device D away from the front face of the joist and they also maintain the device D and hence the portion of the conductor run supported thereby in a true horizontal position, tilting or pivoting of the device D about the axis of, for example, the prong 42, being dependably prevented.

As for the conductor construction C, that becomes snugly housed in the channel 48 of the central part 47, that channel now being closed (see Figure 11) by the front face of the joist itself. And due to the angular relations of the wings or extensions 49 and 50, in whose channels the conductor extends to either side of the channel 48 (see particularly Figure 10), those portions of the conductor construction C of the run (see Figure 2) that extend from one device D to the next device D are carried and held inwardly of the front face of the joist, the parts being so proportioned that preferably these portions of the conductor construction lie in a plane that extends midway between the planes of the respective front and rear vertical faces of the joists 31, 32, 33, etc. Likewise and accordingly, when the wall surfacing is applied to the joists, the free or exposed portions to the run of conductor become positioned substantially midway between the opposed wall facings or surfacings.

The installation of the conductor run as thus described is a simple and speedy operation. No boring of holes or the like has to be resorted to and it will be noted that the operation can be carried on with the simple aid of a hammer. Even the hammering operation is facilitated for, as better appears from Figures 7 and 9, for example, the base portion 41, of which the remaining securing portions form a part, is offset to one side of the run of conductor and the channels of the device D that receive the conductor, and thus the laterally or otherwise projecting portions of the parts 49, 47 or 50 in no way interfere with the operation of hammering the several parts into securing relation with respect to the joist.

Any suitable or appropriate sheet metal may be employed in making up the devices D but preferably the material is so selected or the devices so constructed, illustratively as above pointed out, that relative ease of bending at points N (Figure 6) can be achieved under conditions of use later explained. Relatively soft sheet steel of appropriate gage may be employed. However, and as will later appear more clearly, I may use a sheet metal or so construct the part D that, at the junctions of the extensions 49 and 50 to the main channel-forming part 47, there is present or exists a springiness or yieldability of such a character that the extensions 49 and 50 tend to return to the angular position substantially as shown in Figure 6 if that angular relation is changed; in such case, any suitable spring stock, such as steel or bronze, for example, may be employed.

The run of conductor C (Figure 2) having been secured to the joists 31, 32, etc., as by the devices D, as above described, the wall surfacing, such as lathing and plaster, or the like, may now be proceeded with, and to illustrate the relation of the conductor C and the securing devices D, as the building construction proceeds, let it be assumed that ordinary wooden laths are first to be applied, followed by the usual plastering, and accordingly reference may now be made to Figures 9, 10 and 11. Bearing in mind that the devices D extend horizontally and are preferably in alinement, it is first to be noted that the only material projections beyond the plane of the front face of the joist are caused by principally the part 47 of the device D (Figure 11) and by portions of the laterally directed extensions 49 and 50 (Figure 10). With the conductor construction C of a diameter as small as about $\frac{1}{16}''$, the maximum projection of any part beyond the face of a joist (see now Figure 2) is substantially $\frac{1}{16}''$ plus the thickness of the stock used in making the device D. The wooden laths are then nailed in place on the faces of the joists 31, 32, etc., extending horizontally as in normal practice, and spaced apart by a distance on the order of $\frac{1}{4}''$. In this process of application of the laths, the devices D offer substantially no interference for, as is better shown in Figures 9 and 11, where two laths L—1 and L—2 are shown in relation to the joist 32, it will be seen that one lath L—1 can be secured in position to overlap the base portion 41 of the device D, its lower edge being close to the conductor-receiving channel part 47 and to parts of the extensions 49 and 50 thereof, while the lower lath L—2 extends similarly along the lower edge of device D. Now the laths are themselves of a thickness on the order of $\frac{1}{16}''$ so that the device D, snugly accommodated between two substantially normally spaced laths constitutes no detrimental projection or interference therewith.

The lathing may proceed without endangering the conductor construction C in the slightest. The latter is safely protected by the sheet metal of the device D, it cannot be injured as by any of the nails used in applying the lathing, nor can it be mechanically injured as by a misdirected blow from a hammer, or the like. Furthermore, during this lathing operation, the free or otherwise unprotected portions of the conductor C of the run (see Figure 2) are safely held inwardly of the plane of the front faces of the joists and hence out of harm's way. The inwardly diverging portions of the conductor C (see Figure 10, for example) accommodate themselves snugly to the bends or turns in the successive channels 49a—48—50a, being of sufficient flexibility to do so, and are likewise protected during the lathing and subsequent operations by the extensions 49 and 50 themselves.

Plastering may now follow, resulting in an interrelation of the parts such as is better shown in Figure 11. The plaster, indicated at 52, covers over those portions of the devices D that extend in between adjacent laths and interlocks with the angular conformations formed between these portions of the devices D and the adjacent laths. During the plastering operation the conductor construction C is dependably safeguarded or protected by the devices D which virtually preclude access thereto of plaster, mortar, or the like. Even if some stray wet plaster, mortar, or the like, comes into contact with the conductor construction C, no harm is done for it ultimately dries out and whatever moisture content it possesses is incapable of detrimentally affecting the insulating or other qualities of the conductor construction due principally to the waterproofing and alkaline-resistant character of the outer covering C—6 (Figures 4 and 5), as above described.

Thus, the wall construction with the run of conductor and related devices correlated thereto, may be completed, the resulting arrangement being substantially as is shown in Figure 2. Bearing in mind that it has been assumed that only one location, namely, location O—1 (Figure 1) for an electrical device or outlet is determined or planned for, the installation of the device, illustratively an outlet receptacle, may now be proceeded with. In this connection, it might be noted that where a definite location, such as location O—1 of Figure 1, is known in advance, it is possible, but not necessary, to leave a small loop-like slack in the run of conductor in Figure 2 in that portion thereof between joists 35 and 36, between which is location O—1. It might be preferable to leave such a small amount of slack at that point and it may be assumed that that has been done, but as will later more clearly appear, it makes no substantial difference, so far as the installation of the device or outlet at location O—1 is concerned, whether or not some slack has thus been provided for.

At the location O—1 and preferably substantially centrally of the joists 35 and 36 (Figure 2) and at a height from the floor commensurate with the height of the conductor run above the floor, I now proceed to cut a hole in the finished wall surfacing, illustratively, the lathing and plaster. Through this hole the slack or loop of conductor C is exposed and drawn to a sufficient extent to permit removal of insulating material to expose the conductors C—1 and C—2 which are then electrically connected to the fixture device 85 of Figures 1 and 2, preferably without interrupting the conductors, the device 85, for this purpose, preferably taking forms as illustrated in my co-pending application Serial No. 107,874, which is a continuation in part of this application and being preferably related to the lathing, or the like, as therein set forth in detail.

Let it, however, now be assumed, as earlier indicated, that at any time subsequent to the completion and operation of the wiring system, it is desired, for example, with respect to wall 30 of Figures 1 and 2, to provide additional and theretofore unforeseen or unplanned-for electrical fixtures, such as, illustratively, outlet receptacles. Let it be assumed that such a fixture is now desired to be positioned at location O—2 on that side of wall 30 facing room A.

Accordingly, at the height above the flooring equal to the height of the conductor run or of the installed fixture 86 (Figure 1), and preferably midway of the joists 31 and 32 (Figure 2) there is cut a hole in the wall surfacing exactly as was cut to install the device 85, and substantially similar dimensioned.

With the hand or fingers or with a suitable hook-shaped instrument, this portion of the conductor run (between joists 31 and 32 in Figure 2) is now pulled in a direction outwardly of the hole 114, for, to make connection to a new fixture at any point, a sufficient amount of slack must be obtained. As the finger or instrument pulls this portion of conductor in the above described direction, wing-like extension 50 of the device D—1 that secures the conductor C to the joist 31, and wing-like extension 49 of the device D—2 which secures the conductor construction to the joist 32, yield or bend or flex out of their above described angular relations to the main conductor-receiving channel portions 47 (see Figure 10) and into respective positions better indicated in Figure 3, from which it will be seen that they swing into approximate alinement with the inner face of the wall surfacing.

Thereby, sufficient slack is provided to form a sort of loop or bend in the conductor construction C to make it accessible by way of the hole 114, bare the two conductors, and relate to the latter and to the hole or the wall construction an electrical fixture device 115, as shown in Figure 3.

If the yielding movements of the channel extensions 49 and 50 (Figure 2) do not provide sufficient slack to carry out these operations, though the parts are so proportioned that such will not be the case, continued pulling on the run of conductor construction C through the hole 114 results in the exertion of a tension on those portions of the conductor run that are respectively to the left of joist 31 and to the right of joist 32; the conductor can slide or move along the channel portions 47 of the devices D—1 and D—2 (Figure 2) and cause one or more of the wing-like extensions of these devices to the left of joist 31 and to the right of joist 32 to yield, bend or flex toward the wall surfacing, thereby providing for the additional length of conductor construction C needed to carry out the successive steps and operations above described.

The resultant and new interrelations of the conductor run, devices D—1, D—2, etc., the wall construction and the newly installed and initially unplanned-for fixture 115 is shown in Figure 3 and are emphasized by a comparison of Figures 2 and 3.

Let it now, however, be assumed that an electrical fixture, such as an outlet receptacle, is desired for servicing room B on the other side of the wall 30 (Figure 2) and that a suitable location is that indicated at O—3 (between joists 33 and 34) in Figures 1 and 2. Accordingly, I make a hole 118, like hole 114, in the wall surfacing facing room B, and at an appropriate height, and with the hand or fingers or a suitable hook-shaped tool, the portion of the conductor run that extends between joists 33 and 34 is engaged and pulled outwardly of the hole or opening, the relation of the conductor run to the wall construction and to the devices D—3 and D—4 and the parts of the latter being, up to the moment of pulling of the conductor portion, as is shown in Figure 2.

Wing channel portion 50 of device D—3 and wing portion 49 of device D—4 remain substantially unaffected by the resultant pulling of the conductor for the direction of pull moves the conductor in a direction outwardly or away from the V-shaped channels provided by these wing portions. The conductor construction C, however, begins to move toward the right through the channel portion 47 of the device D—3 (compare Figure 10) and begins to move to the left through the channel portion 47 of the device D—4, and in so doing wing channel portion 49 of device D—3 and wing channel portion 50 of device D—2 on the one hand and wing channel portion 50 of device D—4 and wing channel portion 49 of device D—5 on the other hand, yield, bend or flex in response to these movements of the conductor portions, moving toward approximate alinement with the inner face of the wall surfacing.

As a result, a sufficiently large loop or bend in the conductor is provided in the space between joists 33 and 34 and hence at location O—3 to bring it in exposed relation to the hole 118 to permit baring of the conductors C—1, C—2 and the connection thereto of another fixture, such as fixture 119 of Figure 3, and the mounting of the latter to the wall construction The resultant new interrelations of the various parts now become as shown better in Figure 3 where the newly applied fixture is indicated at 119 and as indicated above these new interrelations become clearer when Figure 3 is compared with Figure 2.

Though the wing channel portions of the devices D change their angular relations to the main channel portions 47 thereof (see Figure 10), the wall surfacing remains undisturbed and mechanically and electrically the installation is just as sound as it initially was. At the points where the conductor run is secured by the devices D to the joists, the devices D, as already mentioned above, afford dependable mechanical and other protection to the conductor construction. Though portions of the conductor run that extend between adjacent joists are brought, due to the yielding or flexing of the wing channel portions, closer to the wall surfacing (compare the conductor portion between joists 34 and 35, as in Figure 2, with its new position as shown in Figure 3), the conductors C—1 and C—2 (Figure 4) embodied therein are still well and adequately mechanically protected due, for example, to the character of the coverings C—5 and C—6. For example, suppose that a nail were driven through the wall surfacing from room A and between the joists 34, 35 and in line with the portion of the conductor run therebetween; such a nail would simply be deflected by these coverings and particularly by the hard helical covering C—5 even assuming that the nail were to penetrate the covering C—6. The hardness and rigidity of the material of covering C—5 is sufficient to deflect a nail even if the conductor construction C were adequately backed up or supported in back of the nail.

Furthermore, these coverings, and particularly covering C—6, can safely withstand the tendencies to abrade the conductor construction, such as might occur when pulling the latter for purposes such as above described, and thus electrical insulation and mechanical protection for the conductors C—1 and C—2 are effectively maintained. Furthermore, the bell mouthings 49$^b$ and 50$^b$ (see Figures 6, 7 and 10, for example) at the ends of the wing channel members 49 and 50, respectively, insure a free and easy sliding of the conductor construction relative to the devices D and also aid in shaping the bends of the conductor construction in the form of easy curves, thereby avoiding particularly during initial installation, relatively sharp or angular bends which, however, the conductor construction is well adapted to withstand anyway.

Any one fixture, such as an outlet receptacle, as illustratively above described, acts, particularly when embodied in the form described in my above-mentioned co-pending application, to anchor the conductor run, and such a dependable anchorage is advantageous, particularly because it prevents any tensioning of the conductor run, such as might be necessary in installing additional fixtures, from detrimentally affecting an existing or already installed fixture. The anchorage, as already above noted, is of a character not only safely to withstand substantial pulls but also to safeguard the bared or connected conductor portions C—1 and C—2 from being given such distortions or other treatment as might bring about mechanical fracture with resultant mechanical and electrical injury to that portion of the system.

I have above assumed for purposes of better illustration, that the electrical fixture to be initially installed or subsequently added to my wiring system is an outlet plug receptacle, but I do not wish to be limited to that specific illustrative embodiment; the fixture may take on various other forms, such as lighting fixtures, switches, and the like, numerous instances of which are broadly well known and hence are within the contemplation of my invention.

From the foregoing the practice of my invention will be clear. Likewise its applicability to or interrelation with specific building or wall, ceiling, floor or like construction, other than that specifically above described, will be clear; for example, I do not wish to be limited to a plaster and wooden lath construction for the wall or ceiling surfacing, and that specific construction is therefore to be understood as illustrative. For example, it may take any other appropriate or suitable form, of which, and also by way of illustration, wire lathing and plaster, plasterboard, composition board, and the like, may be mentioned.

Thus, it will be seen that there has been provided in this invention a wiring system and construction in which the various objects hereinbefore noted, together with many thoroughly practical advantages are successfully achieved.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

I claim:—

1. In a wiring system adapted to be installed in a wall comprising a plurality of spaced joists supporting a suitable wall surfacing, the combination of a run of insulated conductor construction extending transversely of said joists, said conductor construction having an outer non-metallic insulating covering that is substantially moisture proof and fire-resistant, and being relatively bendable, and means securing said run of conductor in position relative to said joists and said wall surfacing, said securing means comprising a device secured to each joist and having a central channel part accommodating said insulated conductor therebetween and the face of the joist, said device having a wing-like channel part at each end thereof extending inwardly from said central part and in a direction away from the inside face of said wall surfacing, thereby to hold portions of said run of conductor intermediate of said joists inwardly of and away from said wall surfacing, said wing-like channel parts being yieldable relative to the central channel part of the device.

2. In a wiring system adapted to be installed in a wall comprising a plurality of spaced joists supporting a suitable wall surfacing, the combination of a run of insulated multiple conductor construction extending transversely of said joists, said conductor construction being relatively pliant, means for holding said run of conductor construction in assembled relation to said wall comprising a plurality of devices, one for each joist, each device having a central channel part that takes over the conductor construction where the latter contacts the front face of a joist, and means for securing said device to the joist, said device having side extensions engaging the conductor run and extending inwardly away from the inside face of said wall surfacing, thereby to hold those portions of the run of conductor that extend intermediate of adjacent joists inwardly away from the wall surfacing, said extensions being yieldable relative to the central channel part of the device, whereby, when slack is desired at any point in the run of conductor, a pulling of the latter at the point where the slack is desired effects a yielding of said extensions in a direction toward the wall surfacing as the conductor run is pulled.

3. A wiring system as claimed in claim 2 in which the device for securing the conductor construction to the joist is made of sheet material with the conductor-receiving channel therein open toward the joist, the central part of the device projecting, when secured to the joist, from the latter by a distance no greater than the thickness of the wall surfacing supported by the joists.

4. A wiring system as claimed in claim 2 in which the device which secures the conductor construction to the joist is made of sheet metal and the central part thereof has extensions inwardly of the joist and along a side face thereof for securing the device to the joist and for preventing tilting of the device out of line with the conductor run.

5. A device for securing a conductor construction to a joist, comprising a sheet metal member having a central channel part for receiving the conductor construction and extensions in the form of wing-like channel parts, the central part and wing parts thereof being of a generally U-shaped cross-section with the open side thereof facing inwardly toward the joist, and means for securing the device to the joist with the conductor in the channel of the central part and for thereby closing the said channel, said last-mentioned means comprising an extension of said central part along the front face of the joist and means for securing said extension to the joist.

6. A construction as claimed in claim 5 in which the means for securing the extension to the joist comprises pronged arm-like extensions of said extension, each on one side of the joist.

7. In a wiring system, in combination, a wall comprising a plurality of spaced joists, a run of insulated conductor construction extending transversely of said joists and having portions that extend along the front faces of said joists, and a plurality of means, one for each joist, for holding said conductor run in position relative to the joists, said means having a part for holding said portions of the conductor run adjacent the front face of the joist and lateral extensions extending inwardly away from the frnt face of the joist for causing portions of said conductor run that are intermediate of said joists to be held inwardly of the front faces of said joists.

8. A conductor support for a wiring system of the character described comprising, in combination, a sheet metal member having a central portion shaped to take over an insulated conductor construction and having means whereby it can be secured to the face of a joist, said support having a side extension engaging said conductor construction and holding it inwardly away from the plane of said face of said joist.

9. A conductor support as claimed in claim 8 provided with a junction between said side extension and said central portion that is bendable whereby said side extension may bend or yield when the conductor construction is pulled in the direction of its length.

10. A conductor support as claimed in claim 8 in which said central portion is channel-shaped to receive said conductor construction and is so related to said securing means that, when secured to said joist face, the latter closes said channel with the conductor construction therein, said side extension being substantially similarly channel shaped.

CHARLES W. ABBOTT.